M. DE ARRIGUNAGA.
DEVICE FOR THE PREPARATION OF COFFEE OR LIKE BEVERAGES.
APPLICATION FILED MAY 13, 1918.
1,346,485. Patented July 13, 1920.
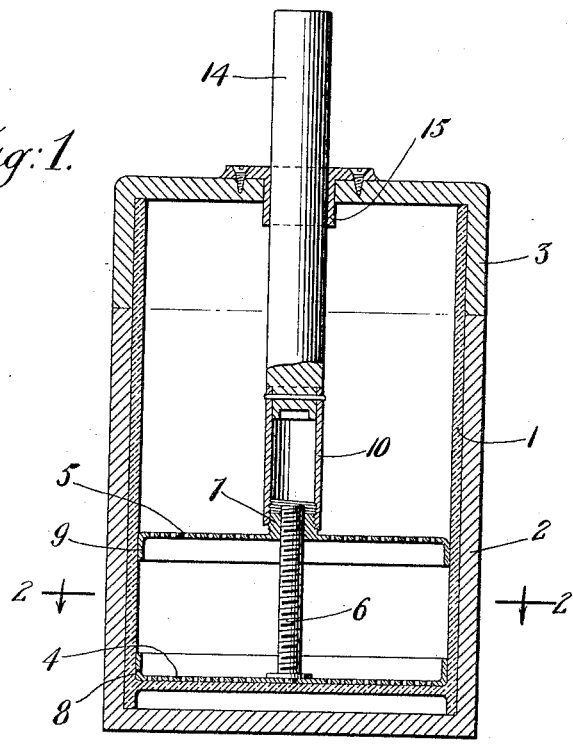
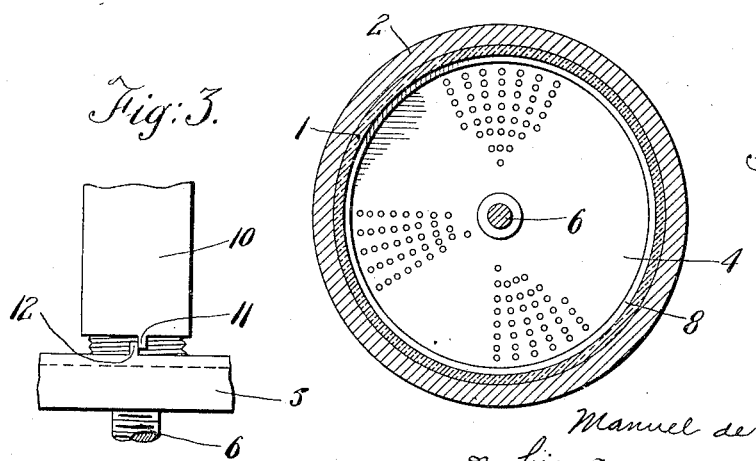
Inventor
Manuel de Arrigunaga
By his Attorneys,
Kenyon & Kenyon

UNITED STATES PATENT OFFICE.

MANUEL DE ARRIGUNAGA, OF NEW YORK, N. Y.

DEVICE FOR THE PREPARATION OF COFFEE OR LIKE BEVERAGES.

1,346,485.  Specification of Letters Patent.  Patented July 13, 1920.

Application filed May 13, 1918. Serial No. 234,073.

*To all whom it may concern:*

Be it known that I, MANUEL DE ARRIGUNAGA, a citizen of the Republic of Mexico, formerly residing in Merida, in the State of Yucatan and Republic of Mexico, but now residing in the borough of Manhattan, in the city, county, and State of New York, have invented certain new and useful Improvements in Devices for the Preparation of Coffee or like Beverages, of which the following is a specification.

My invention relates to devices for preparing beverages, such as coffee or tea, and it has for its principal object the provision of an improved device of this character whereby such a beverage can be quickly and efficiently prepared. To this end I provide a device whereby the water, or extracting liquid, is caused to pass in opposite directions as often as desired through a mass of ground coffee, tea, or other substance, from which the flavor or soluble portions are to be extracted, said device being desirably constructed to prevent the rapid cooling of the contents thereof. The preferred form the invention is particularly adapted for the preparation of individual drinks, the device in which the drink is prepared being suitable for use on the dining table and for drinking the prepared coffee or other beverage directly therefrom.

Another object of my invention is to provide a device of the character referred to which is simple and cheap in construction while being strong and efficient for the intended purpose.

Further objects, features and advantages will more fully appear from the detailed description given below, taken in connection with the accompanying drawings which form a part of this specification.

Referring to the drawings,

Figure 1 is a central vertical sectional view partly in elevation, illustrating one form of my invention;

Fig. 2 is a section taken on line 2—2 of Fig. 1; and

Fig. 3 is a view illustrating a detail of construction.

Referring to the drawings, the numeral 1 designates a cylindrical liquid container which is open at the top and may be an ordinary cylindrical drinking glass. The container 1 is inclosed by a heat insulating casing which, as shown, is composed of a lower or body portion 2, and a top or cover portion 3. The lower portion 2 of the casing covers the bottom of the container 1, and extends upwardly along the sides thereof and terminates a short distance below the top of the container. The top 3 of the casing covers the top of the container 1 and extends downwardly along the sides thereof to the upper edge of the body portion 2 of the casing. The said casing may be made of wood or any other suitable heat insulating material. Arranged within the container 1 for movement longitudinally therein is a piston which comprises lower and upper perforated metallic disks 4 and 5, respectively, the lower disk, as shown, having fixed thereto a central stud 6 threaded through a central nut 7 provided on the upper disk 5. The ground coffee or other material from which the flavor or soluble portions are to be extracted is placed between the two disks 4 and 5, the threaded members 6 and 7 providing means whereby the space between the disks 4 and 5 or the capacity of the piston is adjustable at will to provide for the use of different amounts of ground coffee or other such substance. The periphery of the lower disk 4 is formed with an upwardly directed flange 8 and the periphery of the upper disk 5 with a downwardly directed flange 9, these flanges fitting against the interior wall of the container 1 throughout their outer surfaces so that upon reciprocation of the piston the liquid in the container can pass from one side of the piston to the other only by passing through the piston.

To facilitate the reciprocation of the piston I provide suitable means which, as shown, comprises a rod having at its lower end a hollow sleeve 10 adapted to be threaded at its lower end upon the exterior of the nut 7. To insure the ready detachability of the handle from the nut 7′, means are provided for preventing the sleeve 10 from being threaded down upon the nut until it becomes fast. These means, as shown, comprise a projection 11 upon the lower end of the sleeve 10 which is adapted to engage a projection 12 on nut 7 to stop the rotation of the said sleeve with respect to the disk 5 before the lower end of the said sleeve comes into engagement with the upper surface of the said disk. Sleeve 10 is secured to the lower end of a rod 14 which is arranged to project upwardly through the top 3 of the insulating casing for all positions of the disk 5. The portion 14 of the handle or operating member is desirably made to prevent the passage of heat from the piston to the hand of the operator, and may for this purpose be made of wood or other heat insulating material. The sleeve 10 and stud 6 are so proportioned that the disk 5 may be adjusted downwardly so that its flange 9 engages with flange 8 of the disk 4 without being prevented by the engagement of the stud 6 with the rod 14. The cover 3 is desirably provided with a central bearing member or bushing 15 fitting about the rod 14.

In use the glass or container 1 is first inserted into the body portion 2 of the casing after which the disk 4 is placed at the bottom of the container 1. After the desired amount of ground coffee or the like has been placed upon the disk 4 and spread out to an even thickness, the disk 5, to which the operating handle has been previously connected, is threaded downwardly upon the stud 6, which projects through the layer of coffee, until the disk 5 presses lightly upon the coffee. The disk 5 may be readily rotated by turning the rod 14 between the fingers. Sufficient boiling water to make the desired strength of beverage is then poured into receptacle 1. This is preferably done by first pouring water in slowly until bubbles cease to emerge from the piston, at which time the coffee is saturated with the water and substantially free of air; after this the remaining water to be used is poured into the container. The cover 3 is now placed upon the container 1, the handle 14 projecting outwardly therefrom. It is, of course, to be understood that the portions of ground coffee and water will be controlled not only to give the desired strength of the beverage, but also the desired amount of the same. In the ordinary use contemplated the contents of the container will reach to a point slightly below the top thereof, for example, to the bottom of member 15. With the parts in the condition described, the user while holding the cover 3 with one hand lifts the rod 14 with the other hand until the upper surface of the disk 5 engages the lower edge of the sleeve 15. Of course, if the glass or container 1 is not filled it will not be necessary to lift the piston any farther than above the surface of the liquid. The piston with its contents fits closely against the inner wall of the container 1, as it is elevated, it tends to create a vacuum below the same so that the liquid above the same is forced by the greater pressure in the upper part of the container through the piston and into contact with and between the particles of the coffee in the piston, thus becoming charged with soluble parts of the ground coffee. In case particles of the coffee should pass through the perforations in the lower disk, it may be desirable to permit the device to stand for a moment with the piston in the upper condition to permit the particles to become settled at the bottom of the container. After this the rod 14 and the piston connected thereto are forced slowly downwardly to the bottom of the container 1, forcing the liquid therein to again pass between and in contact with the particles of coffee in the piston. The piston may be moved upwardly and downwardly a suitable number of times for securing the desired strength of coffee. Ordinarily it is found that upon two or three complete reciprocations of the piston, each including an upward and a downward movement, the desired result is obtained.

When it is desired to drink the coffee thus prepared, the cover 3 is removed and, if desired, also the rod 14 and the piston carried thereby, when the desired sugar, cream or other modifying means may be added to the coffee and the latter drunk directly from the container supported in the body portion 2 of the casing. The latter protects the hands of the user against the heat of the container 1 and of the beverage. Instead of removing the piston, the operating rod 14 may be detached therefrom and the piston allowed to remain in the container 1 during the drinking. One may, if he desires, pour some additional water into the container, and with the same ground coffee obtain, by a repetition of the above operations, a second infusion which, though less aromatic than the first infusion, will frequently better suit the taste of certain users.

It will be seen that all of the water or other extracting liquid in the device is caused to come into contact with and pass between the particles of coffee or other substance containing the soluble flavoring, on each complete movement of the piston both downwardly and upwardly, and that the heat is effectively retained within the device by the insulating casing 2, the result being that the desired coffee or other beverage may be procured very quickly.

The apparatus as shown is particularly designed for the preparation of a single drink, or, in other words, for individual use. The invention, broadly, however, is suitable for the preparation of larger amounts of the desired beverage; and although I have described the invention with respect to a particular embodiment, I do not desire to be limited to this embodiment, nor to the details described, as many changes and modifications may be made without departing from the spirit of the invention.

Having thus fully and clearly described my invention what I claim is:

1. The combination of a container and a detachable heat insulating casing surrounding said container and comprising a body and a removable cover, said cover co-acting with said body to completely inclose said container.

2. The combination of a container, a detachable heat insulating casing surrounding said container and comprising a body and a removable cover, said cover co-acting with said body to completely inclose said container, and means for moving a substance such as ground coffee within said container, while permitting access of fluid in said container to such substance, said means having an operating portion projecting through said cover.

3. The combination of a container and a detachable heat insulating casing surrounding said container and comprising a body and a removable cover, said container projecting a substantial distance above said body and said cover co-acting with said body to completely inclose said container.

4. The combination of a container, a detachable heat insulating casing surrounding said container and comprising a body and a removable cover, said container projecting a substantial distance above said body and said cover co-acting with said body to completely inclose said container, a piston within said container, and means projecting through said cover for reciprocating said piston, said piston being adapted to confine within the same a substance such as ground coffee and permitting the passage of liquid in the container through such substance.

5. The combination of a container, a detachable heat insulating casing surrounding said container and comprising a body and a removable cover, said container projecting a substantial distance above said body and said cover co-acting with said body to completely inclose said container, a piston within said container and a detachable means projecting through said cover for reciprocating said piston, said piston being adapted to confine within the same a substance such as ground coffee and permitting the passage of liquid in the container through such substance.

6. The combination with a drinking glass or the like of a detachable heat insulating casing surrounding said glass and comprising a body and a removable cover co-acting with said body to completely inclose said container, and means for moving a substance such as ground coffee within said container, said means having an operating portion projecting through said cover.

7. The combination of a container having heat insulating walls and a heat insulating cover, a piston arranged to reciprocate within said container, said piston comprising upper and lower members adapted to permit the passage of liquid therethrough and to retain a substance such as ground coffee between the same, and means for detachably holding said members at any one of a plurality of distances from each other, and a handle for adjusting one of said members into various operative relations to said means and the other member and for reciprocating said piston, said handle being adapted to pass through said cover.

8. The combination of a liquid container, means for supporting a substance such as ground coffee within the container to permit access thereto of liquid within the container, means projecting out of said container and detachably connected to said supporting means for moving the latter, and means for preventing said moving means from becoming fixed to said supporting means.

9. The combination of a liquid container, a piston arranged therein for movement longitudinally thereof, said piston being adapted to confine within the same a substance such as ground coffee and permitting the passage of liquid in the container past the piston only through the space adapted to contain such substance, means projecting out of said container and detachably connected to said piston for moving the latter, and means for preventing said moving means from becoming fixed to said piston.

10. The combination of a drinking vessel, a piston arranged therein for movement longitudinally thereof, said piston being adapted to confine within the same a substance such as ground coffee and permitting the passage of liquid in the vessel past the piston only through the space adapted to contain such substance, a heat insulating casing surrounding said vessel for retaining the heat therein, said casing comprising a body and a removable cap, said vessel projecting above said body, and means projecting out of said vessel and above said cap for moving said piston.

In testimony whereof, I have signed my name to this specification.

MANUEL DE ARRIGUNAGA.